United States Patent [19]

Brennan

[11] Patent Number: 4,489,978
[45] Date of Patent: Dec. 25, 1984

[54] SUPPORT STRUCTURE FOR MAXIMIZING OR EQUALIZING LUGGAGE SPACE UNDER VEHICLE SEATS

[75] Inventor: Edward J. Brennan, Litchfield, Conn.

[73] Assignee: PTC Aerospace Inc., Bantam, Conn.

[21] Appl. No.: 422,410

[22] Filed: Sep. 23, 1982

[51] Int. Cl.³ .......................................... A47C 15/00
[52] U.S. Cl. .................................. 297/232; 297/449; 244/118.6; 248/188.1
[58] Field of Search ............... 297/232, 449, 450, 451; 244/118.6; 248/188, 188.1, 188.8, 501, 503

[56] References Cited

U.S. PATENT DOCUMENTS

| | | | |
|---|---|---|---|
| 3,316,013 | 4/1967 | Abel et al. | 297/232 X |
| 3,603,638 | 9/1971 | McGregor | 297/216 |
| 4,229,040 | 10/1980 | Howell et al. | 297/232 X |
| 4,375,300 | 3/1983 | Long et al. | 297/232 |
| 4,382,628 | 5/1983 | Pamgren | 297/232 |

FOREIGN PATENT DOCUMENTS 2022403 12/1979 United Kingdom ............... 297/232

OTHER PUBLICATIONS

Page 4 of British Aerospace brochure on Model 748-2B.

*Primary Examiner*—William E. Lyddane
*Assistant Examiner*—Peter R. Brown
*Attorney, Agent, or Firm*—James R. Hoatson, Jr.; Barry L. Clark; William H. Page, II

[57] ABSTRACT

Support structure for a multi-passenger seating unit, especially in aircraft, which is mounted to a seat track in the vehicle floor, includes a transverse floor stretcher tube of less length than the seating unit which is adapted to lie on the floor at the rear of the seating unit and be attached to at least a pair of seat tracks by a track fitting. The rear seat legs extend downwardly from an upper seat frame portion and are mounted to the floor stretcher tube at selected locations which are spaced from the track fittings so as to generally equalize the luggage storage space under each seat. In a preferred embodiment, a tension bracing member is also attached to the lower ends of each of the rear legs and to the floor stretcher tube and extends forwardly and upwardly to a point where it is attached to portions of the upper seat frame at locations which are spaced transversely from the front legs of the seat. The front legs are mounted by track fittings to the seat tracks and are not aligned in a fore and aft direction with the rear legs and tension bracing members. Depending upon the number of seats in a seating unit and the location of the seat tracks in an aircraft, the floor stretcher tube will extend only partially or not at all under the end seats of the seating unit.

10 Claims, 5 Drawing Figures

SUPPORT STRUCTURE FOR MAXIMIZING OR EQUALIZING LUGGAGE SPACE UNDER VEHICLE SEATS

BACKGROUND OF THE INVENTION

The invention relates to vehicle seats and particularly to multi-passenger seating units for aircraft which are adapted to be mounted to slotted seat tracks which are permanently affixed in the floor of the aircraft cabin. Generally, a plurality of seats, such as three, for example, are supported on an elongated upper seat frame which may include a pair of elongated fore and aft positioned lateral stretcher tubes. A pair of front and rear legs and an upwardly and rearwardly extending connecting brace member are attached at their upper ends to the stretcher tubes intermediate the ends thereof, and to the seat tracks at their lower ends. The tubes permit the end seats, or portions thereof, to be supported in a cantilever fashion. Unfortunately, because seat track locations are determined in the design stage of an aircraft by different factors such as fuselage strength requirements or an assumed seating configuration, there are a number of models of aircraft now in service where the fixed locations of the seat tracks are not where the aircraft operator would like them to be. For example, some three-person seating units have their two rear legs positioned such that they underlie portions of the aisle and/or window seat, making it impossible to fit a conventional carry-on bag or briefcase under one or two of the seats in the unit while the third seat has excess space. This situation is very irritating to passengers and can delay the departure of an aircraft as the cabin attendants attempt to locate an alternate place to store the luggage.

Obviously, it would be highly desirable to be able to position the rear legs of a seat and their support braces in positions where the luggage and foot space under the seats would be generally equalized for all passengers. Such a concept is disclosed to a small degree in McGregor U.S. Pat. No. 3,603,638 assigned to the same assignee as the present application. However, the disclosed structure relates principally to an energy-absorbing construction and includes a front beam member of substantial height which extends the entire width of the seating unit, fore and aft vertical beams which enclose the luggage space under each seat, and a pair of rear legs for each sitting position. The patented design includes a tubular lateral beam or stretcher member which lies on the floor at the rear of the unit and extends for the entire width of the seating unit. It serves to transfer loads transversely from the rear legs to the floor track. The McGregor construction, with its relative massive beams and its use of six legs to support three seats, would be much heavier than currently produced cantilevered seating units which require only two legs. Its weight, considering the high cost of fuel, would make its use in an aircraft quite undesirable. Furthermore, to the extent more than two legs are used, the width of the underseat storage space is considerably restricted and, in a tourist seat, would be insufficient to accommodate standard sizes of luggage placed flat on the floor. A seat used by British Aerospace on its Model 748 aircraft utilizes a triangular cross-section rear floor stretcher connected at its ends to the floor tracks and to a pair of fore and aft tension members which overlie the floor tracks. The construction is used on a double seat that can be placed interchangeably on either side of the aircraft. A single leg attached to the rear floor stretcher is affixed to an upper front frame member between the two seats and is welded to a second diagonal member which joins the front baggage bar to the upper rear frame.

SUMMARY OF THE INVENTION

It is among the objects of the present invention to provide a rear leg support structure for a multi-passenger aircraft seating unit which will permit the luggage space under each seat position to be maximized or equalized, even though the unit is supported by seat tracks in the floor which are transversely offset from the desired position of the rear legs. Another object is to provide such a rear leg support structure which is of simple construction and of relatively little weight. An additional object is to provide a floor-mounted tubular support structure for the rear legs of a seating unit which will extend between the seating tracks to which it is attached but will extend beyond such tracks by merely an amount sufficient to engage one or more of the rear legs, thereby minimizing encroachment into the area under the end seats. A still further object is to provide such a structure which can be added to existing seats.

The foregoing and other objects and advantages are achieved by the support structure disclosed herein in which the front legs of a seating unit, which is to be mounted to seat tracks which are not precisely located between seating positions, are connected to a forward upper stretcher tube or other frame member and to the floor-mounted seat tracks in the conventional fashion. However, the rear legs are not directly attached to the floor tracks. Rather, the lower ends of the rear legs are mounted to a short length, floor-mounted stretcher tube which is mounted to the seat tracks. The upper ends of the rear legs are attached to the rearward upper lateral stretcher tube or other frame member. In a preferred embodiment, diagonal tension braces are attached at their lower ends to the rear legs and at their upper ends to the forward upper stretcher tube or equivalent frame member. In a less preferred embodiment, the braces are positioned between the front seat track fittings and the upper rear frame and are curved so as to minimize their interference with luggage since they would pass upwardly through the available storage space under the seat. The rear legs are attached to the floor stretcher tube at locations which are spaced from the seat tracks in the floor so that the space under each seat position of the seating unit for receiving a passenger's luggage is maximized or generally equal. There are, however, at least two ways to consider what is "equal." For example, considering a three-person seat, if the rear legs are positioned directly under the armrests, the width of the luggage space under a window seat will be less than under the center seat and aisle seat due to the side wall curvature of the cabin wall. However, where the two seat tracks in the aircraft floor fall under the center seat and under the aisle seat, the floor stretcher tube of the invention would only extend between the outboard rear leg location and the inboard seat track location and would not limit the fore and aft length of a piece of luggage which could lie flat on the floor under the window seat. Thus, for example, when the rear legs are located just to the right of the center armrests of a particular 57½" long triple seat having the aforementioned seat track locations, an 18½"×14½" article can be positioned so as to lie flat on the floor with its short dimension running fore and aft under the center and aisle seats and its long dimension running fore and aft under the window seat, thus maximizing the use of the floor space and allowing the seat occupant's feet to be comfortably placed on top of an attache case. If the rear legs are mounted to provide an equal amount of floor width under each of the three seats, the aforementioned 18½"×14½" article would have to be positioned with its long dimension running fore and aft under all three seats since the width of each underseat space would be only about 16.7". In such a situation, the rear portion of an article placed under the center and aisle seats would have to rest on top of the floor stretcher and would interfere somewhat with the ability of a passenger to rest his or her legs on top of an attache case.

The present invention offers an additional advantage besides making it possible to maximize or equalize the luggage space under the seats. It can also reduce some of the bending moment applied to the rear upper stretcher tube when one end of a cantilevered seating unit extends transversely from a seat track by a distance greater than the width of a seat position.

DETAILED DESCRIPTION OF THE DRAWINGS

Figure 1:
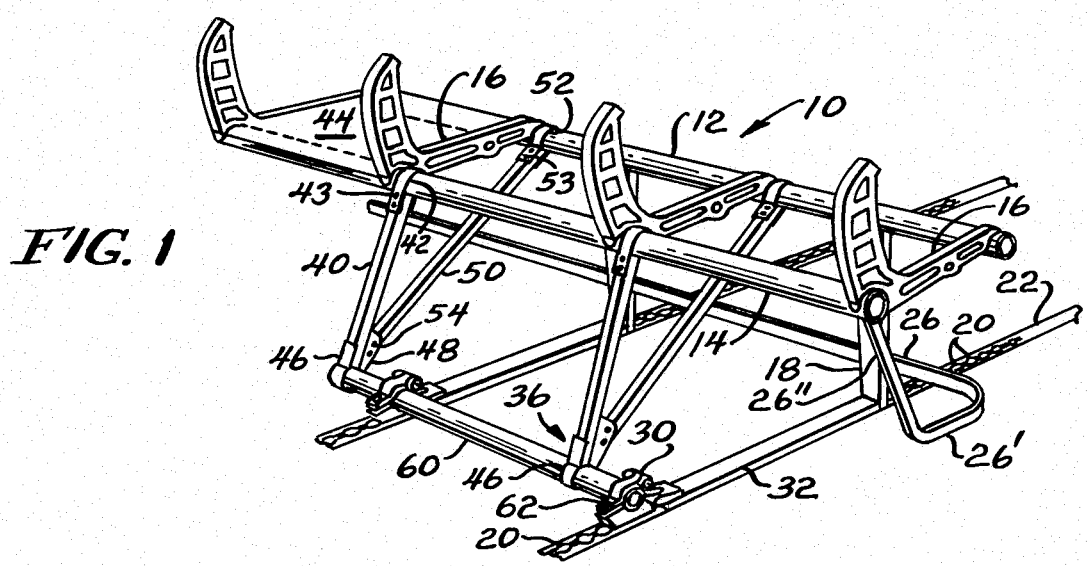
FIG. 1 is a perspective view showing the rear leg support structure of the present invention.

Referring to FIG. 1, one can see how the improved rear leg support structure of the present invention is applied to an otherwise conventional seat frame structure indicated generally at 10. The conventional structure includes an elongated frame comprising a forward lateral stretcher tube 12, a rearward lateral stretcher tube 14, a plurality of fore and aft support members 16, and a pair of front legs 18. The front legs 18 are mounted at their upper ends to the stretcher tube 12. Their lower ends are mounted by track fittings, not shown, which underlie one of the spaced slot openings 20 in the slotted floor tracks 22. The slotted floor tracks 22 are generally spaced apart by about or slightly more than the width of a single seat position. A baggage restraint bar 26 passes through the front legs 18 and curves around the aisle side of the seat where a side portion 26' restricts sideways movement of luggage stored under the seat. The baggage bar is shown as having a rear portion 26" which extends upwardly and is attached to a portion of the upper seat frame such as the member 16. The front legs 18 and their track fittings are mounted at a fixed distance from the rear track fittings 30 by a tension strap member 32. Generally, a shear pin (not shown) is provided on the rear track fitting 30 to engage one of the openings 20 when headed studs on the fitting underlie retaining lips formed between the openings 20.

Figure 2:
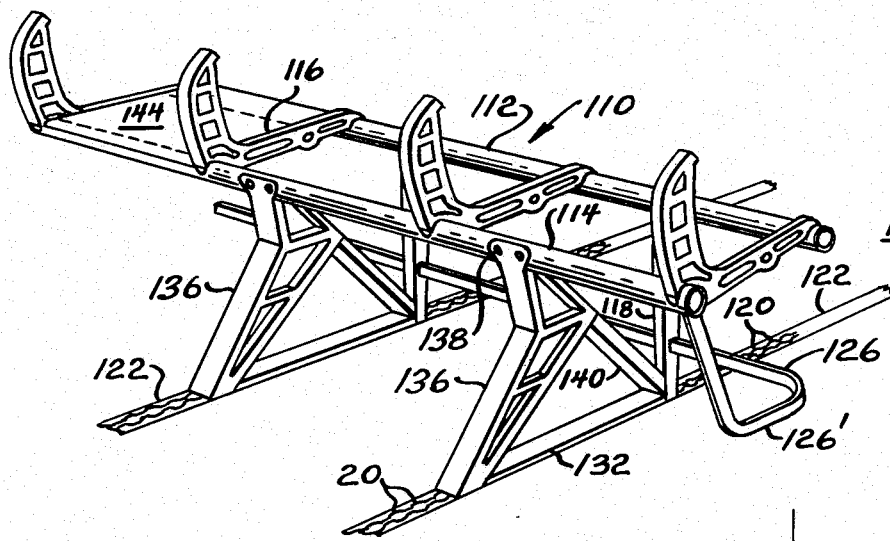
FIG. 2 is a perspective view showing the rear leg support structure of a prior art seat.

Before describing the improved rear leg mounting structure indicated generally at 36, reference should be made to the prior art seat frame structure shown in FIG. 2. In this view, the elements 110-132 correspond to the identical, similarly numbered elements 10-32 in FIG. 1. The rear legs 136 are mounted at their upper ends by fasteners 138 to the rear upper stretcher tube 114. The bottom ends of the rear legs 136 are attached to the floor tracks 122 by track fittings (not shown). A compression member 140 joins the rear leg 136 to the bottom of the front leg 118 and to the front floor track fitting (not shown) and acts as a brace to help transmit seat loads to the floor track in a crash situation. Because the pair of spaced floor tracks 122 are positioned further apart than the width of a single seat position 144, they cause the floor space between the two rear legs 136 to be wider than the width of the seat position, thus giving more storage space under the center seat position than under the aisle (right) seat or window (left) seat. It is also obvious for the floor track positions indicated that the left and right legs 136 are mounted to the right of the fore and aft members 116, thus also providing some interference with a passenger's ability to place his legs under the center of the seat in front of him. Given the fact that an aircraft seat must be able to transmit a 9 g load through its front and rear legs to the floor tracks at widely spaced fore and aft locations, it has been standard practice to provide leg positioning as shown in FIG. 2.

Referring again to FIG. 1, a more specific description will be made of the rear leg support structure 36 which provides the same capability for transmitting crash loads to the floor track as the FIG. 2 construction but in a manner which can maximize or equalize the underseat space for all passengers. A pair of rear legs 40, preferably of a tubular square cross-section, are attached at their top ends to the stretcher tube 14 by a U-shaped metal band 42 which can be placed over the stretcher tube 14 and attached to the leg by a pair of screws 43, or other fasteners. The band 42 can be a simple strap as shown where attachment is to be made to one side or the other of the fore and aft member 16 and requires no disassembly of the seat. For mounting a leg directly under a member 16, the band 42 would be wider than the leg in its center portion where it passes over the stretcher tube and would have a portion of the center portion removed so as to accommodate and straddle the member 16. The lower ends of the legs 40 have a second band 46 welded thereto on their rear surface. The forward end of the band 46 has bracket flanges 48 formed thereon. The flanges provide a mounting for the lower end of a tension tube brace member 50 which engages the forward stretcher tube 12 with a retaining band 52 which is similar or identical to band 42 and mounted with fasteners 53. Before the brace 50 is mounted by fasteners 54 to the bracket flanges 48, the bracket is attached to the forward surface of the leg 40 by a fastener (not shown). Preferably, all of the bands 42, 46, and 52 are fastened so they will exert a friction clamping force on the stretcher tube they surround. To shift the mounting location of the rear legs 40 to more desirable locations which are laterally spaced from the floor tracks 22, a short length of a stretcher tube 60 is rigidly anchored to each of the seat tracks 22 by track fittings 30 which may include a pair of hinged portions which are adapted to be drawn together around the tube. A friction element (not shown) within the fittings tightly engages the tube as the hinged portions are brought together by a fastener 62. The floor stretcher tube 60 is preferably cut to the exact length needed so that it can be engaged by all of the leg anchoring bands 46 and the floor track fittings 30. Thus, the maximum amount of floor space under the seats can be left flat and unobstructed. In most aircraft, this arrangement will mean that no portion of the stretcher tube 60 will obstruct any part of the storage space under one of the seat positions at one end of a triple seat while only a short portion need extend under the seat position at the other end. Referring to FIGS. 1, 4 and 5, one can see that the floor space under the left, or window seat, will be unobstructed by the tube 60. In the seat arrangement shown in FIG. 3, the aisle seat of the triple unit will be unobstructed. In some instances, where the floor track is already a considerable distance under an aisle seat, such as it is in FIG. 5, it might be desirable to place an end cap on the floor stretcher and extend its length for the remainder of the width of the seat position which is above the seat track. Such an extension, shown in dotted lines as 560' in FIG. 5, would eliminate some otherwise available unobstructed floor space but would be more pleasing in appearance from the standpoint of symmetry and esthetics and would also prevent the possible annoyance of the rocking of a piece of luggage resting on the stretcher tube 60 when a passenger was resting his feet on top of the luggage and shifted his position.

Figure 3:
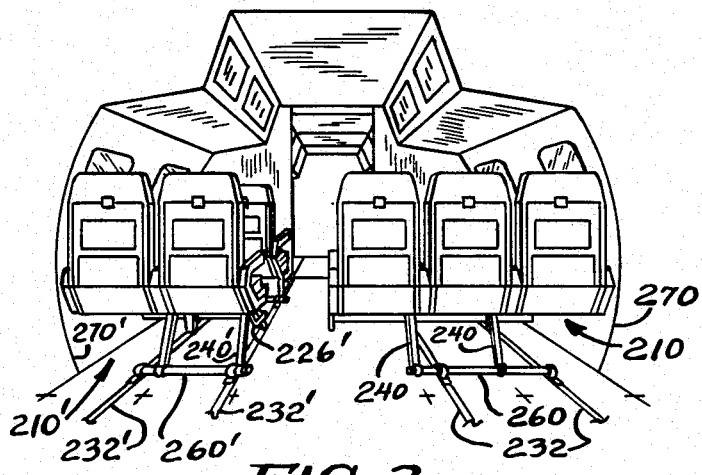
FIG. 3 is a perspective view of an aircraft cabin showing how the improved rear leg structure is applied to both a double or a triple seat.
Figure 4:
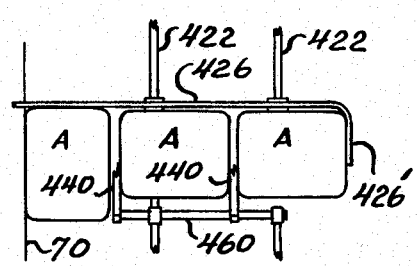
FIG. 4 is a schematic diagram of a rear leg spacing arrangement that will maximize the flat storage space available for accommodating a given large piece of luggage under each seat position of a triple seat.
Figure 5:
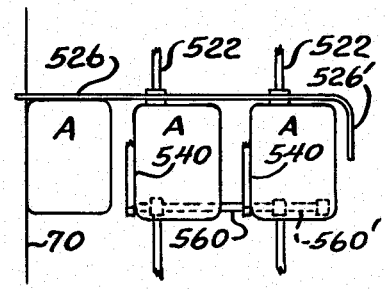
FIG. 5 is a schematic diagram of a rear leg spacing arrangement that will make the width of the floor space under each seat position equal but which requires the large piece of luggage shown in FIG. 4 to overlie the floor stretcher member under the two inner seats.

FIG. 3 shows a perspective view of the cabin of an aircraft having its outboard floor tracks 232, 232' positioned much closer to the cabin walls 270, 270' than is the case in FIGS. 1, 4 and 5 where the outboard tracks 32 are spaced from the wall 570 at its juncture with the floor by a distance greater than the width of one seat position. The view shows that the rear seat support structure can be applied to either a triple seat 210 or a double seat 210'. On the triple seat, the rear legs 240 are supported by the floor stretcher tube 260 to equalize the space under the seat. With conventional rear legs attached to the two seat tracks 232, the space under the aisle and center seats would be wider than the width of a seat position while the window seat would have an extremely narrow space under it. The legs 240' of the double seat 210' are positioned on the floor stretcher tube 260' so as to not only greatly increase the floor space under the window seat as compared to using conventional rear legs, but to lose very little of the space under the aisle seat. This is possible since a conventional inboard leg mounted to the inboard floor track 232' would lose the lateral space between the floor track and the side baggage bar portion 226'.

FIGS. 4 and 5 somewhat schematically illustrate how the floor space under a triple seating unit of a conventional 57.5" width can be maximized or equalized by varying the lateral position of the two rear legs of a seat. In FIG. 4, the floor stretcher tube 460 is of a length such that rear legs 440 are spaced from each other and from the floor tracks 422, baggage bar 226, 226' and cabin wall 70 by distances which will enable a large attache case "A" having outside dimensions of 18.5"×14.5" to be placed flat on the floor under each of the three seats. In this arrangement, two of the three cases "A" can be placed with their short dimension fore and aft to make it possible for a passenger's feet to be placed on the floor or on the stretcher tube behind the luggage. Also, where the case "A" is not too thick, a passenger's feet could be placed on top of it. In FIG. 5, the rear legs 540 are shown as being attached to the floor stretcher tube 560 at locations such that the lateral width of the storage space under all three seats as limited by the cabin wall 70 and the baggage bar 526, 526' is equal. In such an arrangement, an 18.5" attache case "A" will only fit under the seats with its long dimension positioned fore and aft and with its rear end resting on top of the stretcher tube 560. Since the arrangement not only decreases the foot space behind the case "A" for the center and aisle passengers, but decreases the space above the case by the thickness of the tube 560, it would appear that the FIG. 4 arrangement has a distinct advantage over the one in FIG. 5 for two of the passengers and almost no disadvantage for the window passenger who must place his case in the same direction in either arrangement.

One very important advantage of the disclosed construction is that it can be used to modify many different models of existing seats, thus allowing such seats to be upgraded in terms of passenger convenience for a fraction of the cost of a new seat. For example, one could easily remove the leg 136, brace 140 and tension strap 132 from the prior seat 110 in FIG. 2 by unfastening the nuts and bolts holding them. The U-shaped bands 42, 52 can then easily be placed over the tubes 14, 12 and attached to the leg 40 and brace 50. No holes or screws are required to be placed in any of the tubes 12, 14 or 60 so the legs 40 can be adjusted to any desired lateral position. Another advantage can be seen in comparing FIG. 1 to FIG. 2 and noting that the unsupported length of stretcher tube 14 to the left of leg 40 in FIG. 1 is less than the unsupported length of tube 114 in FIG. 2. Since the tube 114 would either have to be of a heavier weight or would have to be reinforced in order to support the cantilevered weight of more than one passenger about outboard leg 136 as compared to the cantilevered load applied to leg 40, it is obvious that the FIG. 1 design offers possible weight savings relative to the stretcher tube 114.

I claim as my invention:

1. A support structure for permitting the storage space under the seats of a multi-passenger aircraft seating unit to be maximized or equalized when the unit is to be mounted to a pair of spaced, parallel slotted floor tracks which, if used to directly mount the unit's rear legs, would provide unequal space under the seats, said structure comprising frame means for supporting at least a major portion of the width of at least one seat position in said unit in a cantilever fashion; a pair of vertically positioned front legs attached to said frame means at their upper ends and having fittings at their lower ends adapted to directly engage said slotted floor tracks; a pair of vertically positioned rear legs attached at their upper ends to a rear portion of said frame means at locations laterally spaced from said front legs; a pair of diagonal braces, each of said braces being arranged in a vertical plane and mounted at its forward end to said frame means and at its rearward end to one of said pair of rear legs at the lower end thereof; a lower, elongated rear stretcher element having a length considerably less than the length of the frame means, said lower rear stretcher element being mounted at spaced locations along its length to said pair of slotted floor tracks; said pair of rear legs being mountable at their lower ends to said lower rear stretcher element at one of a plurality of points laterally spaced from said slotted floor tracks so that the storage space adjacent the rear legs and under each of the seats of said seating unit will be generally maximized or equalized.

2. A support structure according to claim 1 wherein said seating unit has three seating positions.

3. A support structure according to claim 2 wherein the entire width of at least one of the end seat positions in said seating unit has the rear portion of its frame suspended completely in a cantilever fashion relative to said pair of rear legs.

4. A support structure according to claim 1 wherein said seating unit has two seating positions.

5. A support structure according to claim 4 wherein the entire width of at least one of the seat positions in said seating unit has the rear portion of its frame suspended completely in a cantilever fashion relative to said pair of rear legs.

6. A support structure according to claim 1 wherein said frame means comprises a pair of front and rear elongated lateral stretcher tube members which are connected together by a plurality of fore and aft support members.

7. A support structure according to claim 6 wherein each of said pair of diagonal braces is connected by fasteners at its upper end to an inverted U-shaped band element which overlies and frictionally engages the forward stretcher tube member at a location laterally spaced from said front legs, each of said pair of braces being connected by fasteners at its lower end to a generally U-shaped mounting bracket attached to one of said rear legs, said mounting bracket underlying and frictionally engaging said lower rear stretcher element and being mounted to a forward portion of said rear leg by a fastener.

8. A support structure according to claim 1 wherein said lower elongated rear stretcher element has one of its ends terminating at the point where it has one of said pair of rear legs mounted to it.

9. A support structure according to claim 8 wherein said one end of said lower rear stretcher element is laterally spaced from a longitudinal portion of said stretcher element which is mounted between said pair of slotted floor tracks.

10. A support structure according to claim 9 wherein no portion of said lower rear stretcher element extends into the storage space under one of the seat positions in said seating unit which is defined on its inner side by said one of said pair of rear legs.

* * * * *